July 29, 1947.  H. J. BARRETT  2,424,644
JANITOR'S TRUCK
Filed March 1, 1946  2 Sheets-Sheet 1

INVENTOR.
HOWARD J. BARRETT
BY Louis Necho
ATTORNEY.

July 29, 1947.  H. J. BARRETT  2,424,644
JANITOR'S TRUCK
Filed March 1, 1946  2 Sheets-Sheet 2
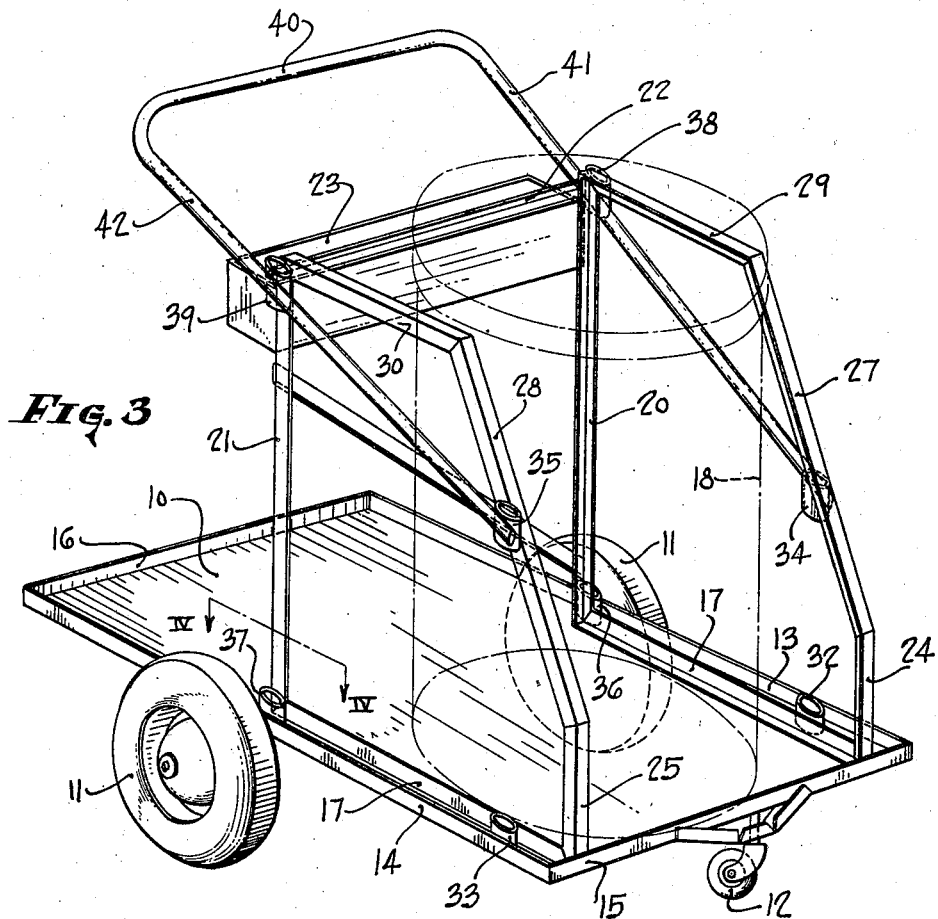
Fig. 3
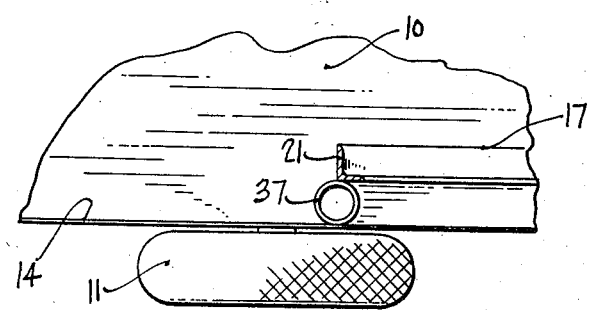
Fig. 4
INVENTOR.
HOWARD J. BARRETT
BY 
ATTORNEY.

Patented July 29, 1947

2,424,644

UNITED STATES PATENT OFFICE 2,424,644

JANITOR'S TRUCK

Howard J. Barrett, Philadelphia, Pa.

Application March 1, 1946, Serial No. 651,069

1 Claim. (Cl. 280—50)

My invention relates to a truck, and more particularly, to a truck especially adapted for transporting a number of objects from one place to another.

One object of the invention is to produce an improved truck.

Still more specifically, the object of this invention is to produce an improved truck for use by janitors engaged in the cleaning relatively large establishments.

In the cleaning of large establishments use is made of a variety of cleaning materials, as well as brooms, mops and similar implements. It is desirable to have an adequate supply of such articles and it is desirable to provide means for the collection of bulky refuse, such as papers and other discarded objects. To carry the above named, and other, objects individually, or bundled together is, to say the least, impracticable. Likewise, storing these objects in a compact manner and where they may be readily available, collectively or individually, also presents a problem.

It is therefore a further and specific object of the invention to produce an improved truck by means of which an adequate assortment of janitors' tools and supplies may be carried about or stored in a convenient and practicable manner.

A still further object of the invention is to produce an improved truck of the type set forth which will be light, durable and inexpensive.

These and other objects are attained by my invention as set forth in the following specification and as illustrated in the accompanying drawings in which:

Fig. 3 is a perspective view of the same.

Fig. 4 is an enlarged section looking in the direction of line 4—4 on Fig. 3.

Figure 1:
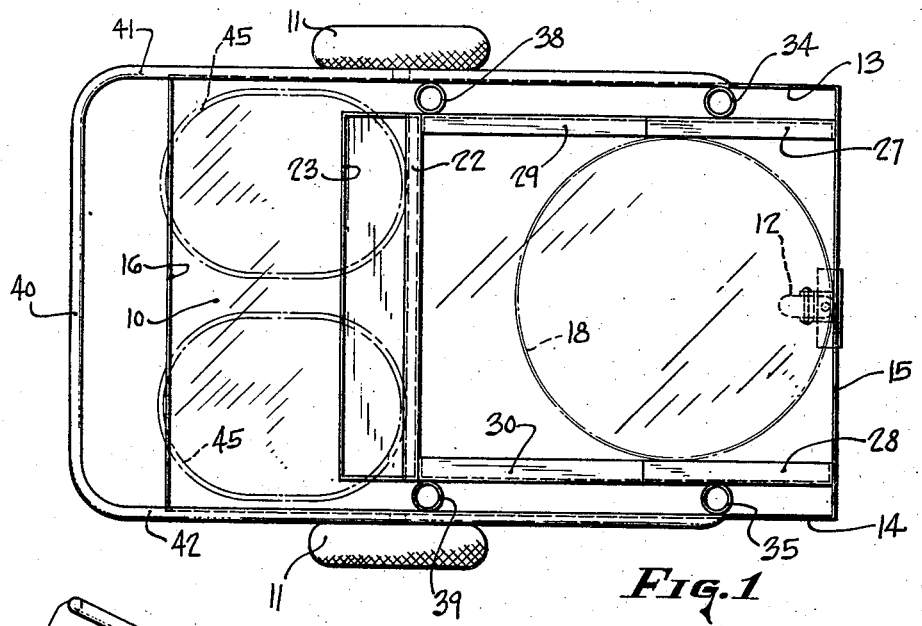
Fig. 1 is a top plan view of an improved truck embodying the invention.
Figure 2:
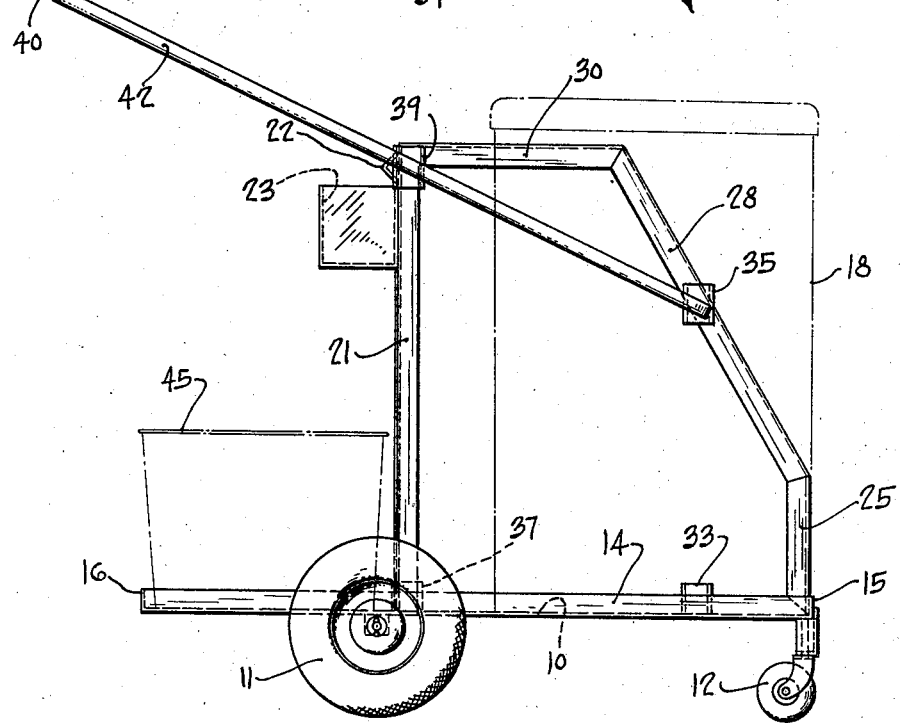
Fig. 2 is a side elevation of the same.

The truck illustrated includes a base or bottom 10 supported on two side wheels 11 and a front, pivoted, pilot wheel 12. The base is provided with outer vertical side flanges 13 and 14 and front and rear flanges 15 and 16. The vertical flanges referred to are preferably formed integrally with the base and with it coact to form a shallow trough. Extending from the front flange 15 to about the middle of the base, and spaced from the side flanges 13 and 14, are a pair of inner vertical walls 17 which, together with the front flange 15 define a space for receiving a relatively large can 18 placed on the front portion of the base. The flange 15 and the inner walls 17 are so related to each other and to the size and shape of a can 18 to be carried on the truck as to engage and retain the can in position as will be seen from Fig. 1. The inner walls 17 are preferably in the nature of angle irons the horizontal portions of which are secured to the base.

Near the rear ends of the inner walls 17, I provide a pair of uprights 20 and 21 to the upper ends of which is secured a cross piece 22. The bottom ends of the uprights are suitably secured to the base or to the rear ends of the inner walls 17, or to both. An upper container 23 is secured to the uprights 20 and 21, and is useful for receiving soap, dusting rags, brushes and similar articles. It will be noted that, when the can 18 is in position, the rear upper portion thereof abuts the cross piece 22, further to steady the can in position.

To the front end of the base, and on either side thereof, are secured two short uprights 24 and 25, to the upper ends of which are secured the lower ends of two rearwardly slanted arms 27 and 28. The rear ends of the arms 27 and 28 are secured to the front ends of a pair of horizontal members 29 and 30, the rear ends of which are secured to the cross piece 22 or to the uprights 20 and 21, or to both. The uprights 20, 21 and 24, 25, the slanted arms 27, 28 and the horizontal members 29, 30, thus form side frames secured to the base and to the front and rear ends of the inner walls 17. These frames, together with the upper cross piece 22, produce a very rugged construction. The side frames coact with the cross piece 22 to retain the can 18 in position during movement of the truck.

Between the front ends of the inner walls 17 and the adjacent portions of the side walls 13 and 14, there are secured two sockets 32 and 33 which register with similar sockets 34 and 35, respectively, secured to the slanting arms 27 and 28. Similarly, between the rear ends of the inner walls 17 and the adjacent portions of the side walls 13 and 14, are secured two additional sockets 36 and 37 which register, respectively, with corresponding sockets 38 and 39 secured to upper ends of the uprights 20 and 21. Each pair of vertically registering sockets is adapted to receive and support a long handled tool, such as a broom, mop, or the like.

The truck thus far described constitutes a complete practical and operative device but, in practice, I prefer to provide a maneuvering handle so as to facilitate the movement of the truck from place to place. For this purpose, I provide a U-shaped handle including a bight portion 40, constituting a grip, and two limbs 41 and 42 which are suitably secured to the side frames of the truck. As shown, the limbs 41 and 42 are secured to the exteriors of the corresponding pairs of sockets 34, 38 and 35, 39, respectively. The grip portion 40 preferably extends beyond the rear wall 16 of the base.

The rear portion of the base between the wall 16 and the can 18 provides room for one or more containers 45 for holding a supply of solid or fluid cleaning materials or rinsing water etc.

From the foregoing it will be seen that I have devised an improved truck by means of which a number of correlated articles, such as brooms, mops, cleaning materials, dusting rags, brushes etc., may be carried about in a convenient manner and ready for instant use, and that by the use of my improved truck for transporting janitors' equipment, the task of cleaning relatively large establishments is greatly facilitated. It will also be noted that (1) due to the simple construction, my improved truck can be inexpensively produced, (2) that the structure is relatively light so as to facilitate movement thereof, (3) that the structure is rugged and can withstand considerable abuse and (4) that the truck is useful also for storing a janitor's equipment in a compact and instantly accessible manner.

Having described my invention, what I claim is:

A truck including a wheeled base, side and end vertical flanges extending upwardly from the perimeter of said base, to define therewith a shallow trough, a pair of inner vertical walls extending upwardly from said base, said walls being spaced inwardly from said side flanges and extending from near one of said end flanges to near the center of said base, a pair of sockets mounted on said base between the opposite end portions of each of said end walls and the juxtaposed portions of said side flanges for receiving the lower ends of elongated tool handles, a pair of polygonal side frames secured to and extending upwardly from said respective inner walls, said side frames being substantially coextensive with said inner walls, said inner walls coacting with the adjacent end flange to provide three point engagement with the lower portion of a can placed on the intermediate portion of said base, and a pair of sockets carried by each of said side frames in vertical registration with the previously mentioned sockets, said upper sockets having through holes therein for passage of said tool handles, the upper portions of said side frames being arranged to provide lateral engagement with and support for the upper portion of said can.

HOWARD J. BARRETT.

REFERENCES CITED

The following references are of record in the file of this patent:

UNITED STATES PATENTS

| Number | Name | Date |
| --- | --- | --- |
| 1,176,978 | Parker | Mar. 28, 1916 |
| 1,746,134 | Thompson | Feb. 4, 1930 |
| 2,311,422 | Walling | Feb. 16, 1943 |
| 1,249,489 | Powers | Dec. 11, 1917 |
| 1,294,619 | Christiansen | Feb. 18, 1919 |